United States Patent [19]

Skelton

[11] Patent Number: 5,642,590
[45] Date of Patent: Jul. 1, 1997

[54] DEPLOYABLE TENDON-CONTROLLED STRUCTURE

[75] Inventor: Robert E. Skelton, West Lafayette, Ind.

[73] Assignee: Dynamic Systems Research, Inc., LaJolla, Calif.

[21] Appl. No.: 551,010

[22] Filed: Oct. 31, 1995

[51] Int. Cl.[6] ............................................. E04B 7/08
[52] U.S. Cl. ................................. 52/81.1; 52/641
[58] Field of Search .............................. 52/81.1, 81.3, 52/DIG. 10, 81.2, 80.1, 81.4, 291, 641, 646, 649.5, 109, 110, 111, 114; 135/124, 126, 128, 131

[56] References Cited

U.S. PATENT DOCUMENTS

| 3,063,521 | 11/1962 | Fuller | 52/640 |
|---|---|---|---|
| 4,290,244 | 9/1981 | Zeigler . | |
| 5,167,100 | 12/1992 | Krishnapillai | 52/109 |
| 5,323,559 | 6/1994 | Allman | 52/646 X |
| 5,448,867 | 9/1995 | Wilson | 52/641 |

OTHER PUBLICATIONS

A. Hanaor, "International Journal of Space Structures", vol. 8 Nos. 1&2 1993, pp. 135–143.
J. Heintze, et al., "Selected Topics in Identification, Modelling & Control", vol. 6, Dec. 1993, pp. 115–122.
Lei Han, et al., "Vibration Sensing In Electrorheological . . . Fiber Optic Sensors", from 1993 ASME Winter Meeting, pp. 1–10.
IEEE, "Transactions on Control Systems Technology", vol. 2, No. 1, Mar. 1994, pp. 45–53.
A.S.K. Kwan et al., "Active and Passive . . . Deployable/Retractable Masts", International Journal of Space Structures, vol. 8, Nos. 1 & 2 1993, pp. 29–40.
J. Rivacoba et al., "A Sequentially Deployable . . . Attached Payloads", International Journal of Space Structures, vol. 8 Nos. 1&2, 1993, pp. 41–52.
J. Mitsugi & T. Yasaka, "Deployable Modular . . . its Surface Adjustment", International Journal of Space Structures, vol. 8, Nos. 1 & 2, 1993, pp. 53–61.
F. Escrig & J.P. Valcarcel, "Geometry of Expandable Space Structures", International Journal of Space Structures, vol. 8, Nos. 1 & 2 1993, pp. 71–84.

*Primary Examiner*—Creighton Smith
*Attorney, Agent, or Firm*—Gary M. Hartman; Domenica N. S. Hartman

[57] ABSTRACT

A lightweight, deployable structure capable of large displacements and sustaining high loads, and whose shape can be precisely monitored and controlled to acquire a wide variety of shapes and varying levels of stiffness, and precisely returned to a desired shape after being subjected to a disturbance force. As such, the structure is highly suitable for use in applications in which information concerning the shape and/or stiffness of the structure can be employed to precisely attain a desired shape, precisely return the structure to a desired shape after being subjected to a disturbance force, or to increase or decrease the structural stiffness in response to changing environmental conditions. The deployable structure is generally composed of one or more structural units, each of which can be articulated between two extreme configurations, one of which is a deployed configuration in which the deployable structure is fully extended. The shape and stiffness of each structural unit is established by rigid compression members that are interconnected by elastic tension members to form two interconnected tiers. The compression and elastic members are interconnected such that the compression members are subjected to essentially axial loads. The shape and stiffness of the structural unit is controlled by loosening and tightening one or more of the tension members and/or shortening and lengthening one or more of the compression members.

20 Claims, 3 Drawing Sheets

DEPLOYABLE TENDON-CONTROLLED STRUCTURE

BACKGROUND OF THE INVENTION

1. Field of the Invention

The present invention generally relates to deployable structures whose shapes can be controlled and altered to modify their size, stiffness and/or damping characteristics. More particularly, this invention relates to a lightweight deployable structure that is capable of large displacements to achieve a variety of shapes with controlled precision, capable of being returned to a desired shape after being subjected to a disturbance force, and characterized by enhanced vibration isolation.

2. Description of the Prior Art

As used herein, deployable structures are generally characterized by a combination of trusses or struts that are interconnected in a manner that enables the structure to be articulated between a collapsed, retracted or stowed configuration and a deployed configuration. Such structures find uses in a wide variety of applications, including portable support structures such as platforms and bridges, vibration isolation for machinery, and structures for use in space that, because of their size, must be collapsible for transport to space. Advantages of deployable structures include improved efficiency because a deployable structure can be entirely assembled during manufacture rather than in the field, improved design performance because greater precision can typically be attained for units assembled during manufacture than for those requiring field assembly, and lower transportation costs because collapsed units are more compact for storage and shipping.

The existing technology for deployable structures is generally focused on two types of structures. A first type is the more traditional truss structure that employs heavy trusses which are mechanically interconnected with pins, welds or bolts. Because of the manner in which the trusses are secured directly together, this type of deployable structure tends to be relatively heavy for the degree of stiffness achieved, often requires powerful actuators to deploy and retract the structure, and readily transmits high frequency disturbances. Accordingly, truss structures are typically limited to applications in which weight, accuracy and vibration isolation are not paramount.

Another known type of deployable structure employs piezoelectric members to precisely control the dimension and damping of the structure. Because piezoelectric materials are brittle and therefore incapable of sustaining high loads, these deployable structures, often referred to as "smart structures," are generally limited to low load applications where minimal displacements are adequate.

A more recent deployable structure design of considerable experimental interest employs struts maintained in static equilibrium by a number of tension members, or "tendons," such that the struts do not touch each other. As discussed in the article "Double-Layer Tensegrity Grids as Deployable Structures," A. Hanaor, *International Journal of Space Structures*, Vol. 8, Nos. 1 & 2 (1993), such structures, referred to as "tensegrity structures," can be deployed and retracted by either elongating or shortening the struts and/or tendons. Notably, tensegrity structures are capable of larger displacements and higher loads than the above-noted "smart structures" and provide better vibration isolation as compared to the more traditional truss structures. Therefore, it would be desirable if a deployable structure characterized by the functional advantages of a tensegrity structure were available in a lightweight configuration whose shape could be precisely monitored and controlled, and whose stiffness could be modified, for use in a wide variety of applications in which weight, load capacity, accuracy and/or vibration isolation are important. In particular, it would be desirable if a tensegrity structure were available that was capable of responding to and counteracting disturbance forces in order to establish and maintain a structural or shape configuration.

SUMMARY OF THE INVENTION

It is an object of this invention to provide a deployable structure capable of being articulated between a retracted configuration and a deployed configuration, and intermediate configurations therebetween.

It is a further object of this invention that such a deployable structure is composed of compression members subjected primarily to compression and interconnected with tension members that are subjected primarily to tension, such that the deployable structure is capable of large displacements and resists transmission of vibration.

It is another object of this invention that the tension members can be adapted to be manipulated in order to precisely articulate the compression members and thereby enable the deployable structure to attain a desired shape and/or achieve a desired stiffness.

It is still another object of this invention that the deployable structure includes sensors to monitor the compression and/or tension members in order to ascertain the shape of the deployed structure and thereby provide appropriate feedback for ascertaining the state of the structure and/or manipulating the tension members and articulating the compression members to resume a desired shape for the structure following a disturbance force.

In accordance with a preferred embodiment of this invention, these and other objects and advantages are accomplished as follows.

According to the present invention, there is provided a lightweight, deployable structure whose shape can be precisely monitored and controlled to acquire a wide variety of shapes and varying levels of stiffness, yet is also capable of large displacements and sustaining high loads. As such, the structure is highly suitable for use in applications in which information concerning the shape and/or stiffness of the structure can be employed to precisely attain a desired shape, precisely return the structure to a desired shape after being subjected to a disturbance force, or to increase or decrease the structural stiffness in response to changing environmental conditions. The deployable structure of this invention is generally composed of one or more structural units, each of which is generally a tensegrity structure. As such, each structural unit can be articulated between two extreme configurations, one of which will be termed the deployed configuration in which the deployable structure is fully extended. In one deployed configuration, each structural unit defines opposing first and second polygon-shaped ends and a polygon-shaped midsection. The first and second polygon-shaped ends each have "X" number of corners, while the midsection has "2X" number of corners so as to establish at the perimeter of the midsection "X" number of odd-numbered corners alternating with "X" number of even-numbered corners. Each structural unit is configured such that the odd-numbered corners of the midsection correspond with the corners of the first polygon-shaped end, and the even-numbered corners of the midsection corresponding with the corners of the second polygon-shaped end.

The corners of the polygon-shaped ends and the midsection of each structural unit is established by rigid compression members that are interconnected by elastic tension members to form two interconnected tiers. The compression and tension members are interconnected such that the compression members are subjected to essentially axial loads— i.e., essentially no bending loads are imposed on the compression members. The shape of the structural unit is controlled by loosening and tightening the tension members and/or shortening and lengthening the compression members. The number of compression and tension members and the manner in which the compression and/or tension members are manipulated enable the deployable structure to acquire a variety of shapes and levels of stiffness or rigidity. Multiple structural units can be interconnected through the use of both compression members and tension members in order to promote the stiffness of the deployable structure, or alternatively solely with tension members so as to achieve maximum maneuverability and control of the deployable structure.

Importantly, the deployable structure of this invention further includes one or more articulators for manipulating the compression and/or tension members in order to articulate the deployable structure between a retracted or collapsed configuration and the aforementioned deployed configurations, or any desired intermediate configuration. In addition, the deployable structure includes sensors for detecting the status of the deployed structure by detecting the condition at one or more of the compression and/or tension members, with feedback being communicated to the articulators in order to acquire or reacquire a desired shape or stiffness for the deployable structure. Because the compression members sustain only compression loads, the difficulty with which bending loads are analyzed is avoided, enabling reliable closed loop control of the deployable structure.

In view of the above, it can be seen that the deployable structure of this invention provides advantages generally associated with deployable structures. Such advantages include improved efficiency because the deployable structure can be entirely assembled during manufacture rather than in the field, and improved design performance because greater precision can typically be attained for units assembled during manufacture as compared to those requiring field assembly. Another advantage is that lower transportation costs are made possible, since the deployable structure is collapsible and therefore is made more compact for storage and shipping. In addition, large displacements and high loads can be sustained and a significant level of vibration isolation can be achieved because the deployable structure is composed of rigid compression members interconnected with elastic tension members.

Furthermore, considerable precision of the deployable structure's shape can be achieved through appropriate sensing of the compression and tension members to provide feedback that forms the basis for selectively and precisely altering the compression and/or tension members. Such capabilities enable the deployable structure to perform as a sensing device in which the compression and/or tension members are closely monitored in order to ascertain the shape or stiffness of the deployed structure in response to an external disturbance force, as well as reestablish a desired shape or stiffness for the structure after being subjected to a disturbance force. Alternatively, such capabilities enable the deployable structure to perform as an actuator in which the compression and/or tension members are selectively manipulated in order to retract and partially or fully deploy the structure.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 1:
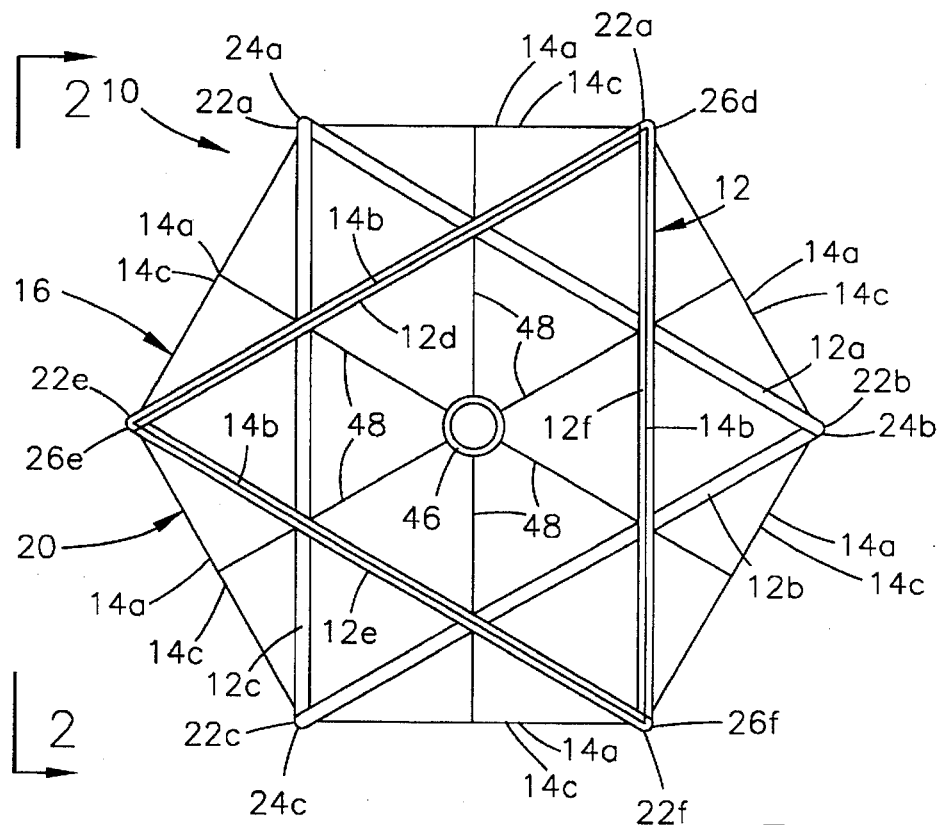
FIG. 1 is a plan view of a single structural unit of a deployable structure in accordance with a preferred embodiment of this invention.
Figure 2:
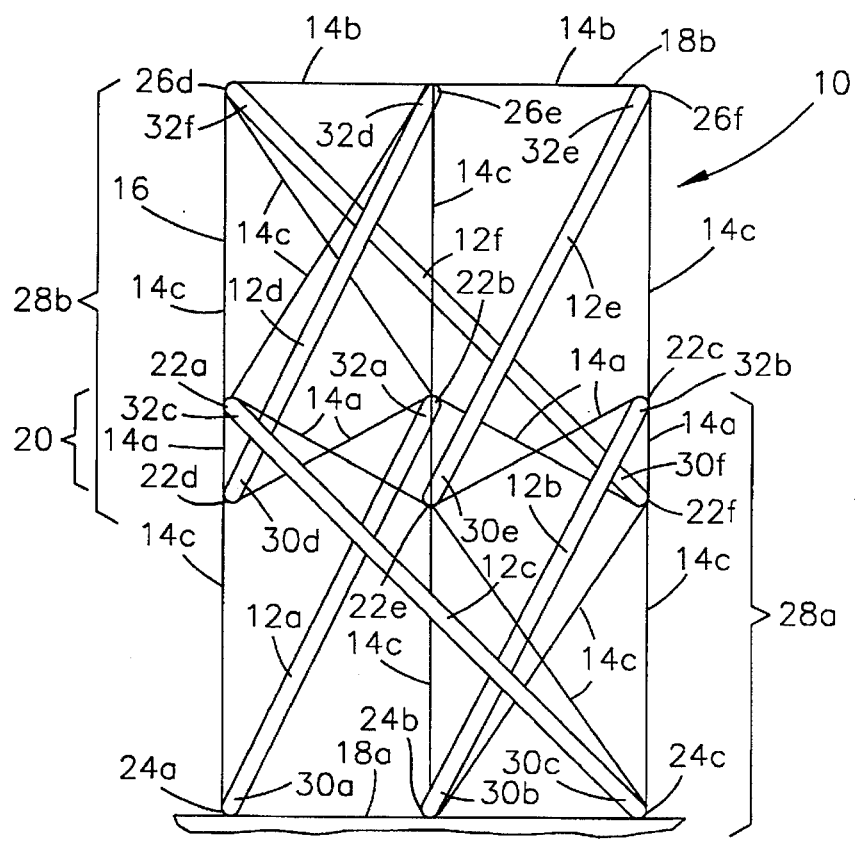
FIG. 2 is a side view of the structural unit of FIG. 1 taken along line 2—2.
Figure 3:
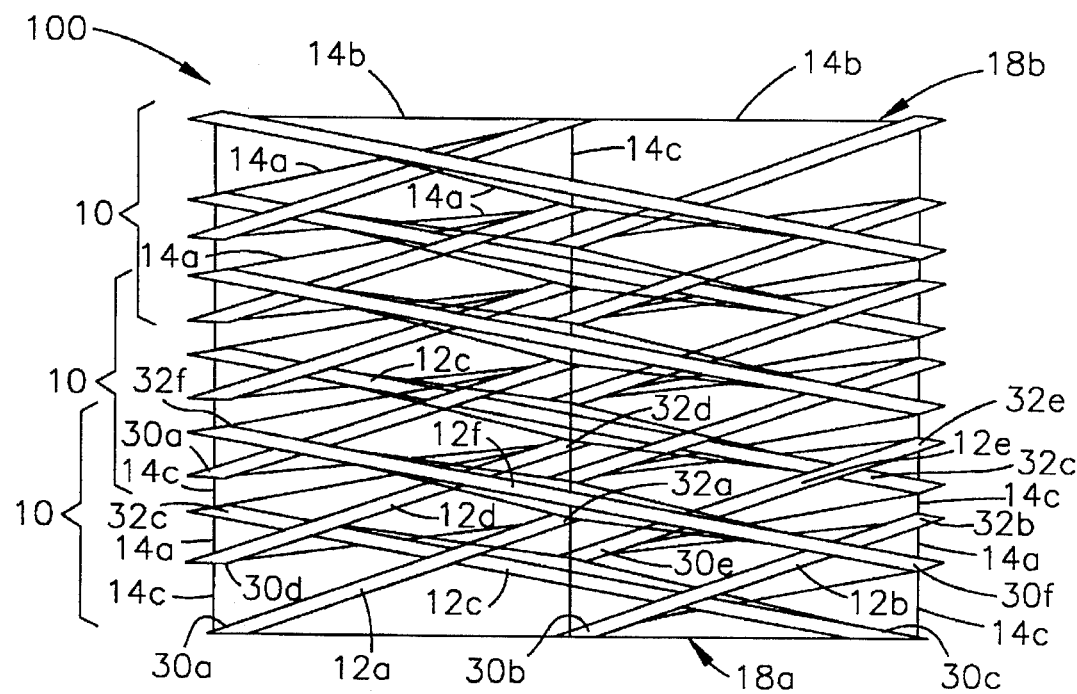
FIG. 3 is a side view of a deployable structure incorporating multiple structural units of the type shown in FIG. 1 in accordance with a first embodiment of this invention.
Figure 4:
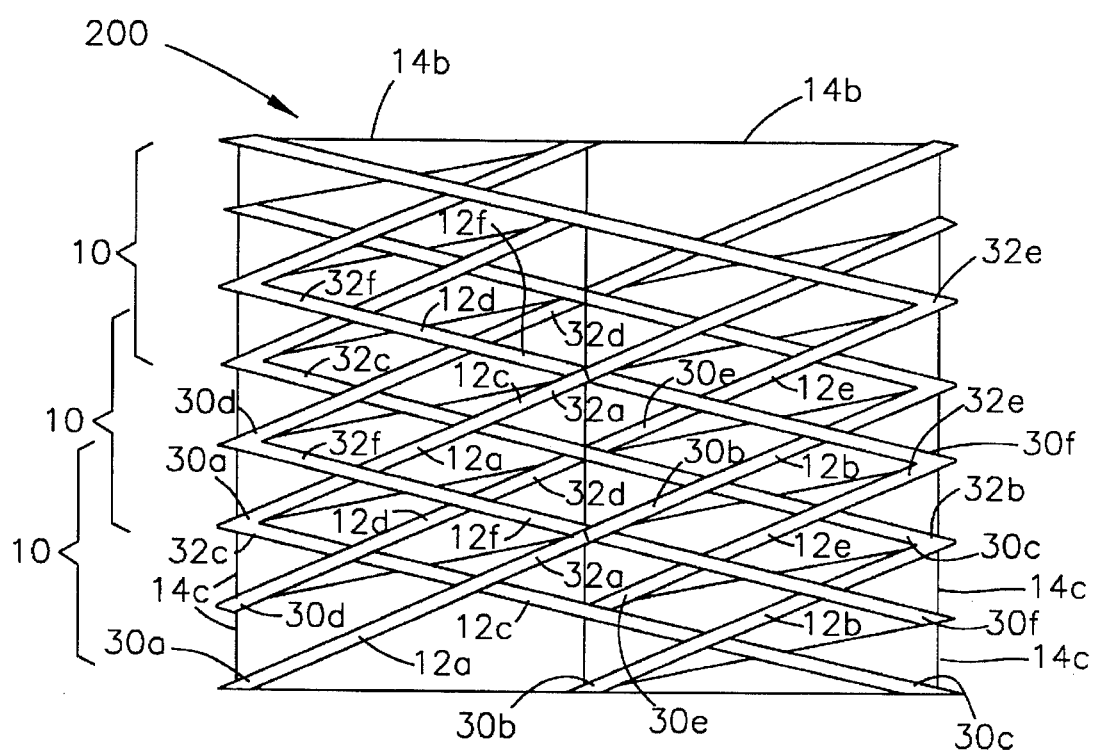
FIG. 4 is a side view of a deployable structure incorporating multiple structural units of the type shown in FIG. 1 in accordance with a second embodiment of this invention.

A deployable structure and a single structural unit 10 of the structure are illustrated in the Figures in accordance with the present invention. Shown in FIGS. 1 and 2 are a plan and side view, respectively, of the structural unit 10, while FIGS. 3 and 4 illustrate deployable structures 100 and 200 that incorporate a plurality of the structural units 10. As shown in FIGS. 1 and 2, the structural unit 10 is generally composed of multiple rigid compression members, or struts 12, interconnected with elastic tension members, or tendons 14. As used herein, the term "rigid" indicates that the struts 12 do not flex or elastically deform readily in order to sustain an axial compression load with bending, while the term "elastic" indicates that the tendons 14 elastically deform when subjected to an axial tensile load, and will return to their prestressed condition once the load is removed. As those skilled in the art will appreciate, a wide variety of materials can be used for the struts and tendons 12 and 14. Though six struts 12a–12f are shown, it will become apparent that greater numbers of struts 12 could be employed within a given structural unit configured in accordance with the invention. In addition, though the struts 12a–12f are shown to be of approximately equal length, their lengths could differ considerably to yield a structural unit 10 appearing substantially different from that shown in the Figures.

FIG. 1 is useful to illustrate the polygonal shape of the structural unit 10 when viewed from one of its longitudinal ends. The unit 10 is shown deployed in FIG. 2, in which the outline of the unit 10 defines an operating envelope 16 having a polygonal shape when as viewed in FIG. 1. Though shown as a regular hexagon in the Figures, the envelope 16 could have any even number of sides, which may be of different lengths. The hexagonal-shaped envelope 16 shown in the Figures is characterized by opposing first and second triangular-shaped ends 18a and 18b, each defining three corners 24a–24c and 26d–26f, respectively. The envelope 16 further has a midsection 20 having a polygonal shape (when viewed from the longitudinal end of the unit 10) with twice as many corners as the first and second ends 18a and 18b—here, a hexagonal shape defining six corners identified as 22a–22f. As viewed in FIG. 1, each of the corners 22a–22c is superimposed with a corresponding one of the corners 24a–24c of the first end 18a and a corresponding one of the corners 26d–26f of the second end 18b. It will be useful to describe the midsection 20 as having at its perimeter a number of "odd" corners 22a–22c alternating with an identical number of "even" corners 22d–22f, with corresponding nomenclature being used for the corners 24a–24c and 26d–26f, respectively.

As is apparent from FIG. 2, the struts 12a–12c form a first tier 28a of the structural unit 10, while the struts 12d–12f form a second tier 28b of the unit 10. Though the struts 12a–12c and 12d–12f within each tier 28a and 28b are shown to be all of the same length, the struts of different tiers and within each tier could have different lengths. Each of the struts 12a–12c has a first end 30a–30c and an oppositely-disposed second end 32a–32c, with the first ends 30a–30c being located at the odd corners 24a–24c of the first end 18a of the envelope 16. With reference to both FIGS. 1 and 2, it can also be seen that each of the second ends 32a–32c of the struts 12a–12c is disposed at one of the odd corners 22a–22c of the midsection 20, but not the same odd corner 22a–22c as its corresponding first end 30a–30c. In other words, each of the struts 12a–12c is inclined, such that their respective second ends 32a–32c are indexed to the next odd corner 22a–22c of the midsection 20. As shown, the second end 32a of the strut 12a is disposed at the odd corner 22b, the second end 32b of the strut 12b is disposed at the odd corner 22c, and the second end 32c of the strut 12c is disposed at the odd corner 22a. Though FIG. 2 shows the struts 12a–12c as being inclined in a counterclockwise direction, they could alternatively have been shown inclined in a clockwise direction. As is apparent from FIG. 2, the second ends 32a–32c of the struts 12a–12c are shown as being disposed in a plane displaced above the first end 18a of the envelope 16.

In a manner similar to that described for the struts 12a–12c, the struts 12d–12f are also arranged in the second tier 28b of the structural unit 10 to have their first ends 30d–30f located at different even corners 22d–22f of the midsection 20. Specifically, the first end 30d of the strut 12d is disposed at the even corner 22d, the first end 30e of the strut 12e is disposed at the even corner 22e, and the first end 30f of the strut 12f is disposed at the even corner 22f. Furthermore, the second ends 32d–32f of the struts 12d–12f are located at one of the even corners 26d–26f of the second end 18b corresponding to a different even corner 22d–22f from that of their corresponding first ends 30d–30f. Specifically, the second end 32d of the strut 12d is disposed at the even corner 26e, the second end 32e of the strut 12e is disposed at the even corner 26f, and the second end 32f of the strut 12f is disposed at the even corner 26d.

As apparent from FIGS. 1 and 2, each of the first ends 30d–30f of the struts 12d–12f is disposed between two adjacent second ends 32a–32c of the struts 12a–12c of the first tier 28a. In the embodiment of FIG. 2, the first ends 30d–30f of the struts 12d–12f are disposed in a second plane that is parallel to the plane containing the second ends 32a–32c of the struts 12a–12c, though these two planes need not be parallel. Importantly, the plane containing the first ends 30d–30f of the struts 12d–12f is disposed beneath the plane containing the second ends 32a–32c of the struts 12a–12c. In essence, the first ends 30d–30f are cradled by the tendons 14a between the second ends 32a–32c. According to the invention, the plane defined by the first ends 30d–30f must lie below the plane defined by the second ends 32a–32c in order for the unit 10 to be structurally stable, i.e., exhibit static equilibrium. As such, the polygonal shape of the midsection 20 cannot lie in a single plane, but instead will be skewed in some manner, as is depicted in FIGS. 2, 3, 4 and 6. FIG. 4 depicts the plane defined by the first ends 30d–30f as being disposed approximately half the distance between the plane defined by the second ends 32a–32c and the first end 18a of the structural unit 10. The different characteristics of the arrangements shown in FIGS. 3 and 4 will be discussed in greater detail below.

With reference again to FIGS. 1 and 2, the structural unit 10 is shown to include six tendons 14a, each of which interconnects one of the second ends 32a–32c of the struts 12a–12c with an adjacent one of the first ends 30d–30f of the struts 12d–12f. Furthermore, the second ends 32d–32f of the struts 12d–12f are interconnected with three tendons 14b, and additional tendons 14c further interconnect the struts 12a–12c with the struts 12d–12f. Specifically, the tendons 14c are employed to interconnect:

(a) the first end 30a of the strut 12a with the first end 30d and the second end 32c;

(b) the first end 30b of the strut 12b with the first end 30f and the second end 32a;

(c) the first end 30c of the strut 12c with the first end 30e and the second end 32b;

(d) the first end 30d of the strut 12d with the second end 32f;

(e) the first end 30e of the strut 12e with the second end 32d;

(f) the first end 30f of the strut 12f with the second end 32e;

(g) the second end 32a of the strut 12a with the second end 32f;

(h) the second end 32b of the strut 12b with the second end 32e; and (I) the second end 32c of the strut 12c with the second end 32d.

As shown in FIG. 1 (but omitted from FIGS. 2 through 6 for clarity), each of the tendons 14a are capable of being manipulated to alter their tension so as to selectively articulate the structural unit 10 between its retracted and deployed configurations, as well as any intermediate configuration therebetween. The structural unit 10 of FIG. 1 is shown as being equipped with a centrally-disposed shaft 46 that is rotatably supported relative to the unit 10. The shaft 46 is interconnected to each of the tendons 14a with an appropriate number of tendons 48 or other suitable members, which serve to draw the tendons 14a toward the shaft 46 when the shaft 46 is rotated, resulting in an increase in the tension within the tendons 14a. In this manner, the tension in the tendons 14a can be selectively increased or decreased in order to articulate the structural unit 10 between its deployed and stowed configurations, or to control the rigidity (stiffness) of the unit 10 after deployment.

While a shaft and tendons are illustrated, numerous other techniques for altering the tension in the tendons 14a will be apparent to one skilled in the art, and such techniques are within the scope of this invention. Alternatively, one or more of the struts 12a–12f shown in the Figures can have a telescoping design that enables the struts 12a–12f to be extended and retracted electrically, mechanically, pneumatically or hydraulically. As such, if the tension in the tendons 14 is increased and/or the struts 12a–12f are extended, the structural unit 10 is extended to acquire its deployed configuration, characterized by the shape of the envelope 16. In contrast, if the tension in the tendons 14 is decreased and/or the struts 12a–12f are retracted, the structural unit 10 is collapsed to acquire a stowed or collapsed configuration. Finally, if only a select few of the tendons 14 or struts 12a–12f are altered, the shape of the structural unit 10 can be uniquely altered from that shown in the Figures.

Figure 5:
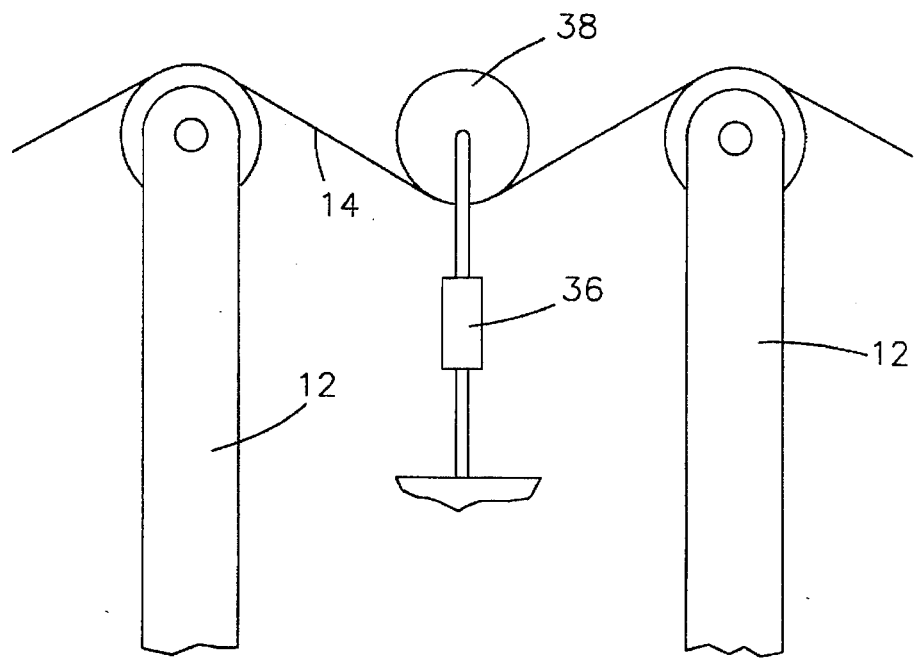
FIG. 5 shows a tension adjusting and measuring device that can be used with the structural unit of FIG. 1 in accordance with one aspect of this invention.

According to this invention, the ability to deploy and stow the structural unit 10 shown in FIGS. 1 and 2 is useful when coupled with a system that enables the shape and/or stiffness of the unit 10 to be accurately detected, and then provides feedback to the struts and/or tendons 12 and 14 in order to enable the unit 10 to alter its configuration or stiffness, or to reestablish a desired configuration or stiffness. The manner in which the configuration of the unit 10 is sensed can be through sensing the tension in at least some of the tendons 14 and/or the compression or length of the struts 12. FIG. 5 schematically represents one such embodiment, in which the tension in a tendon 14 is detected by a piezoelectric strain gauge 36 equipped with a roller 38 and placed between any adjacent two of the struts 12. Those skilled in the art will appreciate that alternative methods and devices for measuring stress or strain in the tendons 14 and/or the struts 12 could be employed, and all such methods and devices are within the scope of this invention.

Turning now to FIGS. 3 and 4, multiple units 10 are shown as being assembled to form deployable structures 100 and 200. The deployable structure 100 of FIG. 3 illustrates a configuration in which the plane containing the first ends 30d–30f of the struts 12d–12f is disposed beneath the plane containing the second ends 32a–32c of the struts 12a–12c, and less than half the distance between the latter plane and the first end 18a of the structure 100. As shown in FIG. 3, such an arrangement of units 10 results in each unit 10 being interconnected with its adjacent units 10 with only a set of the tendons 14c. For example, the second end 32c of the strut 12c of the bottom unit 10 is interconnected with a tendon 14c to the first end 30a of the strut 12a of the second unit 10, and the second end 32b of the strut 12b of the bottom unit 10 is interconnected with a tendon 14c to the first end 30c of the strut 12c of the second unit 10 As such, the units 10 are vibrationally isolated from each other, such that the deployable structure 100 resists transmission of vibrations between its upper and lower ends 18a and 18b. In addition, the maneuverability of the structure 100 is maximized, providing a maximum degree of freedom for the units 10. As such, the deployable structure 100 is of the type most suited for dynamic structures such as payload pointing structures, vibration isolation of machinery, antennas, equipment that must be compactly stowed for transport to space, and robotic members.

In contrast, FIG. 4 depicts the plane containing the first ends 30d–30f of the struts 12d–12f as being disposed approximately half the distance between the plane containing the second ends 32a–32c of the struts 12a–12c and the first end 18a of the structure 200. As a result, the second ends 32a–32c of the struts 12a–12c are shown as contacting the first ends 30a–30c of the struts 12a–12c of the adjacent unit 10, instead of being interconnected with tendons as shown for the embodiment of FIG. 3. Preferably, the ends 30a–30c and 32a–32c are pivotably connected. In this manner, the deployable structure 200 is capable of being deployed and collapsed in essentially the same manner as the structure 100 of FIG. 3, but is characterized by greater stiffness. As such, the deployable structure 200 is of the type most suited for such structures as buildings, bridges, support platforms for space telescopes and antennae, and airfoils for aerospace applications. In particular, this invention is highly suitable to form the support structure for an airfoil, wherein the selective control of the shape and stiffness of the structural unit 10 enables the airfoil to be selectively and precisely altered in order to affect its aerodynamics.

Figure 6:
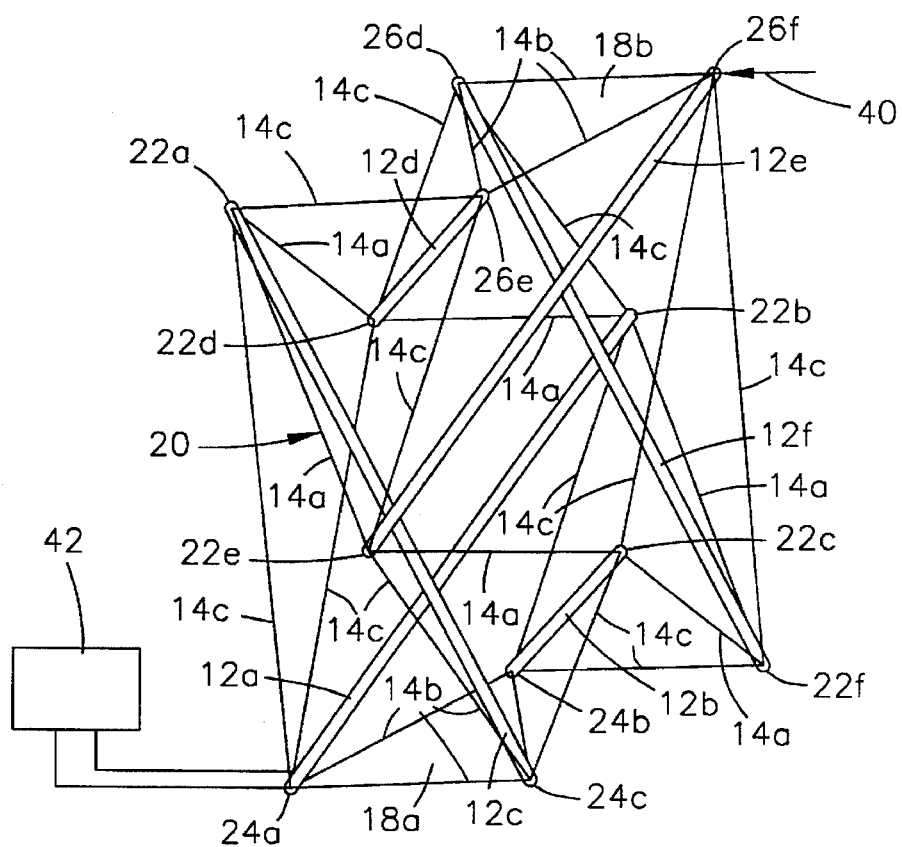
FIG. 6 is a schematic representation of a sensing structure incorporating the structural unit of FIG. 1.

With either arrangement depicted in FIGS. 3 and 4, a deployable structure in accordance with this invention must be operative to enable the shape and/or stiffness of its units 10, individually or in unison, to be altered in order to achieve precise articulation of the deployable structure or achieve a desired level of stiffness for the structure. Such a capability can be advantageously exploited if the deployable structure is used as an actuator to precisely position a payload or a sensor that can respond to an external disturbance force to counteract the force or otherwise accommodate the force such that the desired shape and/or stiffness of the structure are not adversely affected. One such example is represented in FIG. 6, in which a deployable structure 300 incorporating the single structural unit 10 of FIG. 1 is adapted to respond to a disturbance force 40 applied to one of the corners 26f of the structure 300. Shown schematically is a feedback control 42 for communicating the output of sensors (not shown) coupled with one or more of the tendons 14, to a mechanism (not shown) for altering the tension in the tendons 14 and/or the lengths of one or more of the struts 12a–12f, so as to articulate the structure 300 in response to changes in the tension of the tendons 14 as a result of the disturbance force 40. If the structure 300 is a building, such that the struts 12 and tendons 14 are beams and cables, respectively, within the building, examples of potential disturbances to the structure 300 include high winds and earthquakes. Through monitoring the output of the sensors coupled with the tendons 14, whose output will change as a result of the structure's configuration being forcibly altered by the disturbance force 40, rapid compensation can be made in the tension within selected tendons 14 in order to counteract the disturbance and thereby appropriately modify the stiffness of the structure 300, reestablish the original configuration of the structure 300, or possibly reconfigure the structure 300 in order to attain a configuration better adapted to the new environment of the structure 300 or more readily capable of withstanding the disturbance.

The dynamics of the structural unit 10 or any of the deployable structures 100, 200 and 300 of this invention are complex and therefore not obvious to one skilled in the art. However, this difficulty is overcome by the availability of software, such as DYCOM available from Dynamic Engineering Company, Inc., of Palm Harbor, Fla., which develops equations of motion that are able to reliably model the structural unit 10 and deployable structures 100, 200 and 300 of this invention due to their construction—namely, the struts 12 and tendons 14 undergo only axial forces, such that the extreme difficulty of accurately modeling bending moments is completely avoided. Consequently, the simplicity of the axial forces within the structural unit 10 enables reliable modeling, and therefore reliable control of the struts 12 and/or tendons 14 through the use of analytical determinations using the feedback control 42.

In view of the above, it can be seen that a significant advantage of deployable structures configured in accordance with this invention is that large displacements and high loads can be sustained and a significant level of vibration isolation can be achieved due to the use of rigid struts 12 that are interconnected with elastic tendons 14. Operationally, considerable precision of a structure's shape and stiffness is achieved by sensing of the condition (e.g., tensile or compressive stress, length, etc.) of the struts 12 and tendons 14 to provide a feedback that enables one or more of the struts 12 and/or tendons 14 to be altered such that a desired configuration and/or stiffness for the structure is established, or reestablished if in response to an external disturbance force. Such capabilities enable a deployable structure to perform as a sensing device in which the struts 12 and/or tendons 14 are closely monitored in order to ascertain the shape of the deployable structure in response to external disturbances, and perform appropriate alterations to the struts 12 and/or tendons 14 in order to counteract or compensate for the disturbance. Alternatively, such capabilities enable a deployable structure to perform as an actuator in which the struts 12 and/or tendons 14 are selectively manipulated in order to partially or fully deploy and retract the structure, as well as reestablish a desired shape for the structure after being subjected to an external disturbance force.

While our invention has been described in terms of a preferred embodiment, it is apparent that other forms could be adopted by one skilled in the art. For example, a different number of struts, tendons and/or structural units could be employed to construct a deployable structure, the physical and mechanical characteristics of the struts and tendons could be modified, and a deployable structure of the type disclosed could be adapted for applications and operating environments other than those noted. Accordingly, the scope of our invention is to be limited only by the following claims.

The embodiments of the invention in which an exclusive property or privilege is claimed are defined as follows:

1. A deployable structure having a first configuration and a deployed configuration in which the deployable structure defines opposing first and second polygon-shaped ends and a polygon-shaped midsection, the first and second polygon-shaped ends each having "X" number of corners, the midsection having "2X" number of corners so as to establish at the midsection "X" number of odd-numbered corners alternating with "X" number of even-numbered corners, the odd-numbered corners of the midsection corresponding with the corners of the first polygon-shaped end, the even-numbered corners of the midsection corresponding with the corners of the second polygon-shaped end, the deployable structure comprising:

a first plurality of rigid compression members forming a first tier of the deployable structure, each of the first plurality of rigid compression members having a first end and an oppositely-disposed second end, the first ends of the first plurality of rigid compression members being located at corners of the first polygon-shaped end corresponding to different odd-numbered corners of the midsection, each of the second ends of the first plurality of rigid compression members being located at one of the odd-numbered corners of the midsection corresponding to a different corner of the first polygon-shaped end than that of its corresponding first end;

a second plurality of rigid compression members forming a second tier of the deployable structure, each of the second plurality of rigid compression members having a first end and an oppositely-disposed second end, the first ends of the second plurality of rigid compression members being located at different even-numbered corners of the midsection, each of the second ends of the second plurality of rigid compression members being located at one of the corners of the second polygon-shaped end corresponding to a different even-numbered corner of the midsection than that of its corresponding first end, such that each of the first ends of the second plurality of rigid compression members is disposed between two second ends of the first plurality of rigid compression members;

a first plurality of elastic tension members, each of the first plurality of tension members interconnecting one of the second ends of the first plurality of rigid compression members with an adjacent one of the first ends of the second plurality of rigid compression members;

a second plurality of elastic tension members, each of the second plurality of tension members interconnecting one of the second ends of the second plurality of rigid compression members with an adjacent one of the second ends of the second plurality of rigid compression members;

means for articulating the deployable structure between the first and deployed configurations, the articulating means being in communication with at least one of the first and second plurality of rigid compression members and first and second plurality of elastic tension members;

means for sensing the deployed structure at its first and deployed configurations and at intermediate configurations therebetween; and feedback means for communicating an output of the sensing means to the articulating means.

2. A deployable structure as recited in claim 1 wherein the sensing means comprises means for sensing tension in at least some of the first and second plurality of elastic tension members.

3. A deployable structure as recited in claim 1 wherein the sensing means comprises means for sensing compression in at least some of the first and second plurality of rigid compression members.

4. A deployable structure as recited in claim 1 wherein the articulating means comprises means for altering tension in the first and second plurality of elastic tension members.

5. A deployable structure as recited in claim 1 wherein the articulating means comprises means for altering lengths of the first and second plurality of rigid compression members.

6. A deployable structure as recited in claim 1 wherein the first plurality of rigid compression members have equal lengths and the second plurality of rigid compression members have equal lengths.

7. A deployable structure as recited in claim 1 wherein each of the first and second plurality of rigid compression members has an elongate shape.

8. A deployable structure as recited in claim 1 wherein the first polygon-shaped end is defined at a rigid base to which the first ends of the first plurality of rigid compression members are pivotably attached.

9. A deployable structure as recited in claim 1 wherein the number of corners on the first and second polygon-shaped ends is three and the number of corners of the midsection is six so as to provide the midsection with three odd-numbered corners alternating with three even-numbered corners, whereby there are three of the first plurality of rigid compression members and there are three of the second plurality of rigid compression members.

10. A deployable structure as recited in claim 1 wherein each of the first and second plurality of rigid compression members is subjected predominantly to an axial compression load.

11. A deployable structure as recited in claim 1 wherein the second ends of the first plurality of rigid compression members are disposed in a first plane a distance from the first polygon-shaped end, and wherein the first ends of the second plurality of rigid compression members are disposed in a second plane.

12. A deployable structure as recited in claim 11 wherein the second plane is disposed between the first plane and the first polygon-shaped end.

13. A deployable structure as recited in claim 11 wherein the second plane parallel to the first plane and disposed approximately half the distance between the first plane and the first polygon-shaped end.

14. A deployable structure as recited in claim 1 wherein the sensing means and feedback means are operative to cause the articulating means to articulate the deployable structure in response to external forces applied thereto.

15. A deployable structure as recited in claim 1 wherein the articulating means is operative in cooperation with the sensing means and feedback means to cause the deployable structure to articulate to the first configuration, the deployed configuration and the intermediate configurations therebetween.

16. A deployable structure as recited in claim 1 wherein the first and second plurality of rigid compression members and the first and second plurality of elastic tension members constitute a first structural unit of the deployable structure, the deployable structure comprising multiple structural units, each of which is substantially identical to the first structural unit.

17. A deployable structure as recited in claim 16 wherein the second ends of the first plurality of rigid compression members of the first structural unit are spaced apart from the first ends of the first plurality of rigid compression members of an adjacent one of the multiple structural units.

18. A deployable structure as recited in claim 16 wherein the second ends of the first plurality of rigid compression members of the first structural unit are pivotably attached to the first ends of the first plurality of rigid compression members of an adjacent one of the multiple structural units.

19. A deployable structure comprising multiple structural units, each structural unit of the multiple structural units having a retracted configuration and a deployed configuration in which the structural unit defines opposing first and second polygon-shaped ends and a polygon-shaped midsection, the first and second polygon-shaped ends each having "X" number of corners, the midsection having "2X" number of corners so as to establish at the midsection "X" number of odd-numbered corners alternating with "X" number of even-numbered corners, the odd-numbered corners of the midsection corresponding with the corners of the first polygon-shaped end, the even-numbered corners of the midsection corresponding with the corners of the second polygon-shaped end, each structural unit of the multiple structural units comprising:

a first plurality of rigid compression members forming a first tier of the structural unit, each of the first plurality of rigid compression members having a first end and an oppositely-disposed second end, the first ends of the first plurality of rigid compression members being located at corners of the first polygon-shaped end corresponding to different odd-numbered corners of the midsection, each of the second ends of the first plurality of rigid compression members being located at one of the odd-numbered corners of the midsection corresponding to a different corner of the first polygon-shaped end than that of its corresponding first end, the second ends of the first plurality of rigid compression members being disposed in a first plane a distance from the first polygon-shaped end;

a second plurality of rigid compression members forming a second tier of the structural unit, each of the second plurality of rigid compression members having a first end and an oppositely-disposed second end, the first ends of the second plurality of rigid compression members being located at different even-numbered corners of the midsection, each of the second ends of the second plurality of rigid compression members being located at one of the corners of the second polygon-shaped end corresponding to a different even-numbered corner of the midsection than that of its corresponding first end, such that each of the first ends of the second plurality of rigid compression members is disposed between two second ends of the first plurality of rigid compression members, the first ends of the second plurality of rigid compression members being disposed in a second plane;

a plurality of elastic tension members, each of the plurality of tension members interconnecting one of the second ends of the first plurality of rigid compression members with an adjacent one of the first ends of the second plurality of rigid compression members;

means for altering tension in the plurality of elastic tension members so as to articulate the structural unit to the retracted and deployed configurations and intermediate configurations therebetween;

means for sensing tension in at least some of the plurality of elastic tension members; and feedback means for communicating an output of the sensing means to the altering means such that the sensing means and feedback means are operative to cause the altering means to articulate the structural unit in response to external forces applied thereto.

20. A deployable structure as recited in claim 19 wherein the second plane is disposed approximately half the distance between the first plane and the first polygon-shaped end, and wherein the second ends of the first plurality of rigid compression members of the one of the multiple structural units are pivotably attached to the first ends of the first plurality of rigid compression members of an adjacent one of the multiple structural units.

* * * * *